April 30, 1968     P. R. LEE     3,381,100
ELECTRIC WATER HEATER THERMOSTATIC CONTROL WITH AN OVERHEAT
CONTROL SWITCH FOR OPEN-CIRCUITING A PAIR OF HEATERS
Filed Sept. 28, 1965     2 Sheets-Sheet 1
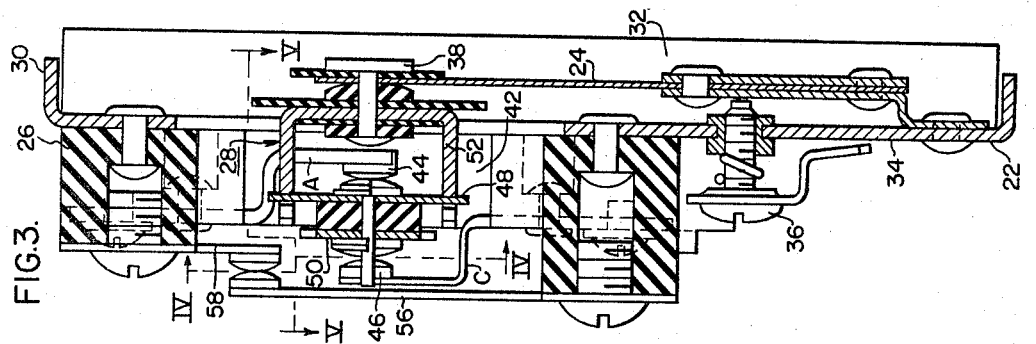
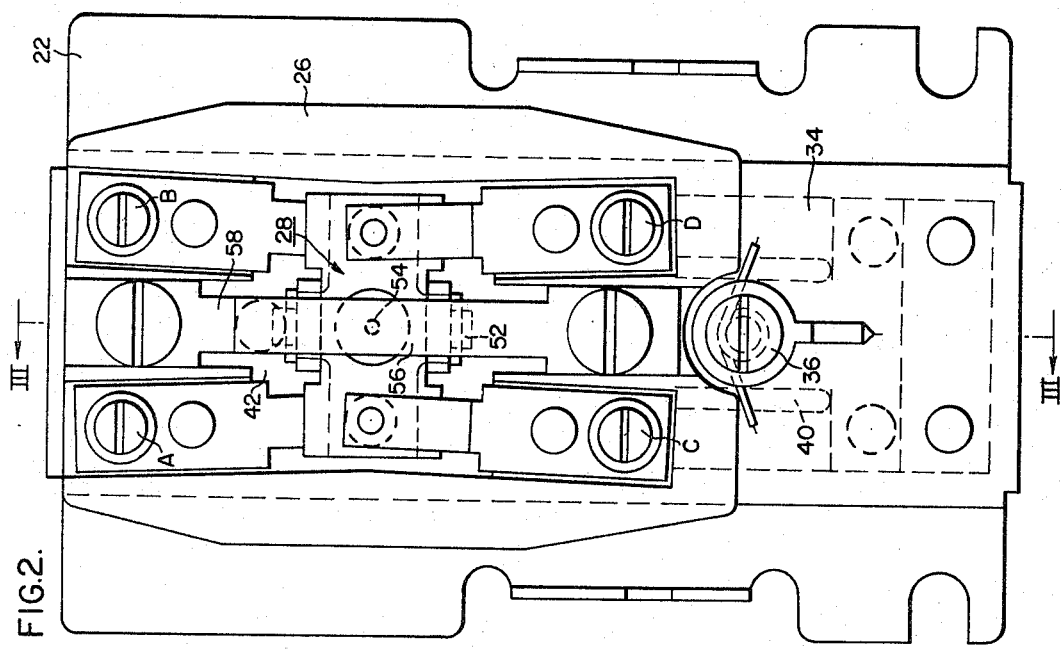
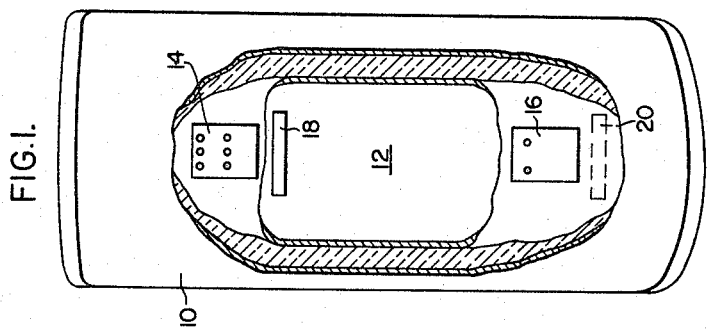
WITNESSES
INVENTOR
Paul R. Lee
BY
ATTORNEY

# United States Patent Office 3,381,100
Patented Apr. 30, 1968

3,381,100
ELECTRIC WATER HEATER THERMOSTATIC CONTROL WITH AN OVERHEAT CONTROL SWITCH FOR OPEN-CIRCUITING A PAIR OF HEATERS
Paul R. Lee, Mansfield, Ohio, assignor to Westinghouse Electric Corporation, Pittsburgh, Pa., a corporation of Pennsylvania
Filed Sept. 28, 1965, Ser. No. 490,844
6 Claims. (Cl. 200—138)

ABSTRACT OF THE DISCLOSURE

Electric water heater thermostatic control having alternate normal positions for directly controlling the tank upper heater and indirectly controlling the tank lower heater, and incorporating overheat switch means electrically common to both heaters and operable to an open position in response to a water overheat condition driving the control beyond the one alternate normal position and causing one set of switch contacts to yield in that direction.

---

This invention relates generally to electric water heater controls, and in particular to the incorporation of a water temperature over heat limit control in the top thermostatic control element of an electric water heater.

One conventional heat control arrangement for electric water heaters of the type using an upper and a lower heating element, and to which the invention is applicable, includes a top thermostatic control and a bottom thermostat. The top control includes electrical contact means for both the upper and lower heating elements, while the bottom thermostat can deenergize only the lower element. These dual element water heaters are typically wired to operate in what is called a load-limiting fashion; which means that the upper and lower heating elements cannot both be energized at the same time. With this type of operation, the top control opens the circuit to the upper element and simultaneously closes a circuit to the lower-element when the water in the upper portion of the tank has been heated to the desired temperature. As hot water is drawn from the top of the tank, cold water enters the tank at the bottom and tends to keep the lower element energized. If no water is drawn from the tank, the lower element will heat the water in the lower part of the tank to the desired temperature and the bottom thermostat will open the circuit to the lower element. Thus, neither element is then energized until the whole tank again cools to the point where the bottom thermostat recloses again. If the water usage is sufficiently great that the water temperature in the upper part of the tank falls below the desired value, the top control responds by breaking the circuit to the lower element and again closing the circuit to the upper element. Accordingly, it will be appreciated that in normal usage, the lower heating element and bottom thermostat are worked more frequently than their upper counterparts.

At least partly as a result of this condition, failure of the bottom thermostat is more likely than failure of the top control. With the wiring arrangement described, if the bottom thermostat fails by remaining in a closed position, the top control is incapable of deenergizing the lower element. Also, if either the top or bottom element becomes grounded neither the top nor bottom thermostat will disconnect the elements even if they open satisfactorily. Hence, as heating continues, steam can be created and an unsafe condition results. While pressure relief valves are sometimes installed to protect the heater against faulty controls, they are an added expense. Further, due to their typically extended inactivity, they sometimes fail to function when needed. The provision of a thermally actuated safety thermostat at the top of the tank is a satisfactory solution, but if it is provided in the form of a separate element it also increases the control cost substantially.

The object of this invention is the provision of a thermally actuated safety thermostat (i.e., over heat limit means) of low cost incorporated in the top control in a manner which takes advantage of the normal operation of the control and integrates the over heat limit means in the arrangement.

In accordance with the invention, I arrange those switch contact means in the top thermostatic control connected to the lower heating element to be yieldable, and provide an overheat switch for opening the circuit to the elements in response to a preselected yielding of the contact means indicating an overheat condition in the water heater. The yielding of the contact means for the lower heating element is effected by movement of a thermally responsive contact bridging assembly which, under normal operating conditions, moves back and forth within a limited range to make and break the circuits to alternate heating elements. However, in response to a high temperature, the bridging assembly moves past the normal position in which the bridging assembly simply contacts the lower heating element contact means and opens the overheat switch. Thus, a relatively inexpensive but effective overheat limit switch arrangement is provided.

The invention will be described in connection with the accompanying drawing illustrating a preferred embodiment of the invention, and wherein:

FIGURE 1 is a partly broken face view of an electric water heater of the character to which the invention may be applied;

FIG. 2 is a face view of the top thermostatic control element according to the invention;

FIG. 3 is a sectional view corresponding to one taken along the line 3—3 of FIG. 2;

Figure 4:
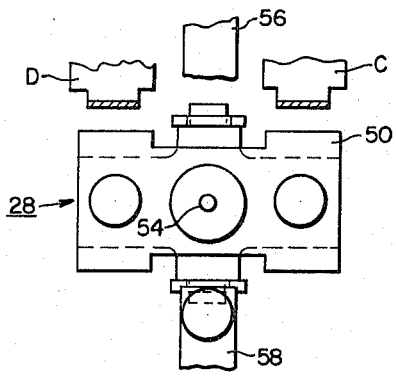
FIG. 4 is a fragmentary sectional view corresponding to one taken along the line 4—4 of FIG. 3, and mainly showing the bridging assembly.
Figure 5:
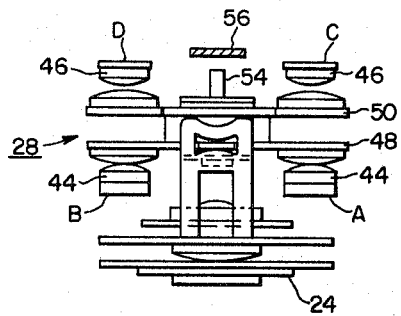
FIG. 5 is a sectional view corresponding to one taken along the line 5—5 of FIG. 3 with certain parts omitted for clarity.

As shown in FIG. 1 the electric water heater typically includes an outer casing 10, an inner tank 12 for holding the water to be heated, and with the space between filled with insulation. The top thermostatic control 14 is mounted on the inner tank at an upper level, and a bottom thermostat 16 is similarly mounted at a lower level. They control energization of the electrical resistance heating elements projecting into the tank and which are indicated in FIG. 1 by the blocks 18 and 20 immediately below the respective control elements. The electrical wires connecting the controls and elements are not shown in FIG. 1.

The principal parts of the top thermostatic control shown in FIGS. 2–5 are: a base 22; a thermally responsive bimetallic element 24 carried on the back or under side of the base 22; an insulating terminal block 26 mounted on the top side of the base 22 and arranged to support the contact means for the energization of the heating elements of the water heater; and, a bridging assembly 28 carried at the free end of the bimetallic element 24 and disposed so that its path of movement makes and breaks the contacts in the proper sequence according to the temperature condition of the water being heated.

The base 22 may conveniently be formed as a metallic stamping adapted to be secured to the exterior surface of the water tank 12, and provided with down turned flange portions 30 on both sides and at both ends to provide a partially enclosed chamber 32 between the base and the tank 12 to accommodate the bimetallic element. As seen in FIG. 2, the lower end 34 (in that view) of the raised portion of the base is provided with temperature setting numerals and an adjusting screw 36 with a pointer is rotatably mounted upon the base raised portion 34 to permit adjustment of the underlying bimetallic element.

Referring now to FIG. 3, the lower end of the bimetallic element 24 is secured to the underside of the raised portion 34 of the base, and extends generally parallel to the base raised portion in the accommodating space 32 and terminates in a movable opposite end 38. Preferably the bimetallic element is of the type which is snap-acting in its normal operating temperature range. This may conveniently be accomplished in known manner by providing two lengthwise extending slots 40 (FIG. 1) in the otherwise solid bimetallic strip and crimping the two outer legs out of their initial plane so that movement of the bimetallic element is restrained until the bimetallic element reaches a given temperature at which point the resistance to movement imposed by the crimped legs is overcome and the bimetallic element snaps to an opposite position.

The insulating block 26 (FIGS. 2 and 3) is riveted to the front face of the raised portion 34 of the base 22. The block carries the various contact arms and accommodates the movable bridging assembly 28 in its central hollow portion 42. The bridging assembly is carried in insulating relation on the free end of the bimetallic element 24 and accordingly moves with it.

The pair of contact terminals for the upper heating element 18 are designated A and B (FIG. 2) and the pair of contact terminals for the lower heating element 20 are designated C and D. Each of these contact terminals is generally Z-shaped in longitudinal section. The contacts A and B are mounted on the block 26 so that their contact surfaces 44 (FIGS. 3 and 5) are located down in the hollow central portion 42 of the block and on the back side of the two parallel bridging bars 48 and 50 of the bridging assembly 28. The terminals C and D are mounted so that their contact surfaces 46 are on the front side of the bridging bars. Thus, the one set of contact surfaces are arranged in back contact relation with respect to the other set of contact surfaces.

The two bridging bars 48 and 50 are both disposed in the space between the contact surfaces of the terminals A–B and C–D so that the bar 48 faces contacts 44 and bar 50 faces contacts 46. A U-shaped bracket 52 (FIGS. 4 and 5) carries the bridging bars at the proper distance from the free end of the bimetallic element 24.

An insulated actuating pin 54 is centrally located on the face of bar 50 in the space generally between the contact surface ends of the terminals C and D and is adapted, upon sufficient movement of the bridging assembly, to operate an overheat limit switch. This overheat limit switch may conveniently take the form of a pair of overlapping flexible, leaf elements 56 and 58 (FIG. 2) secured at their ends to the insulating block 26 and each provided with a contact surface at its free end facing the contact surface on the other leaf.

The contact arms A and B are preferably of relatively thick stock so that the arms remain substantially stationary when engaged by the bridging assembly. In contrast, thereto, the arms C and D are fabricated of relatively flexible, thin stock so that these terminals are yieldable when engaged by the bridging assembly with sufficient force. The leaf arm 56 of the overheat switch is also of relatively thin stock so that it may be flexed away from the other arm 58 when the bridging assembly pin 54 bears against the arm 56 with a preselected force corresponding to an overheat condition.

In the normal operation of the control the bridging assembly is in one of two alternate positions; either bridging the contact terminals A and B, or alternately bridging the contact terminals C and D.

Figure 6:
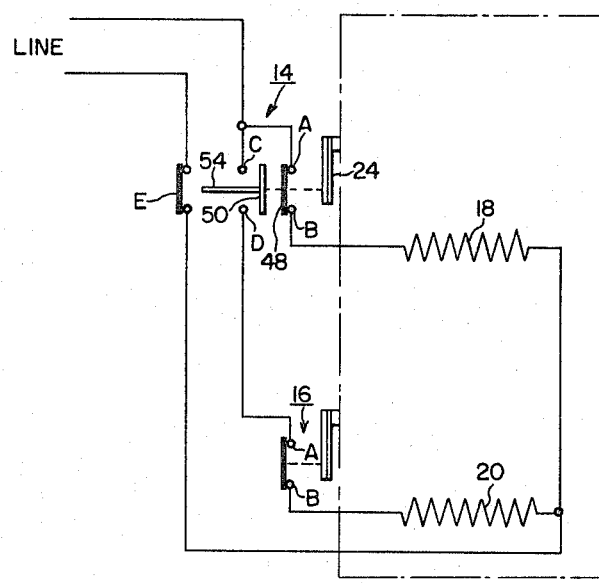
FIG. 6 is a schematic diagram of the electrical circuit for a water heater incorporating the invention.

The connection of the contact terminals and the heating elements in the electrical circuit for operating the water heater is best shown in FIG. 6. One side of the power line is connected to terminals A and C of the top thermostatic control 14. Terminal B is connected to the upper heating element 18 and terminal D is connected to the lower heating element 20. The bottom thermostat element 16 is essentially the same as the top control except that it has only one set of contacts, located the same as the A–B terminal contacts, and connected in series with the lower element 20. The overheat limit switch, designated E, is in the power line common to both the upper and lower elements.

The manner in which the water heater operates with this circuit according to the invention is as follows. It is assumed the thermostats are set for 150° F. water. With the water in the tank being below a temperature of 150° F. as sensed by the top control the bridging bar 48 completes the circuit between terminals A and B to energize the upper heating element 18. When the water temperature in the top part of the tank exceeds 150°, the bimetallic element moves the bridging assembly to break from contacts A and B, and to make the contacts C and D with the other bridging arm 50. This deenergizes upper element 18 and energizes lower element 20. The lower element will remain energized until the bottom thermostat senses a water temperature in excess of 150°, and breaks the circuit. The bottom thermostat will then cycle in accordance with the variations in water temperature in the lower part of the tank. The upper element remains deenergized until a heavy drain of water causes a reduction in water temperature in the top part of the tank below about 150°. During normal operation, the overheat limit switch remains closed.

If the bottom thermostat 16 fails in a closed position, or if the lower element 20 becomes grounded, and water is not being withdrawn at a substantial rate, the water temperature will rise to values well above the desired normal limit. In this condition of failure the top thermostatic control is holding the bridging bar 50 in contact with the terminals C and D to complete the circuit to the lower element 20. However, as the temperature in the top part of the tank continues to rise toward an unsafe level, the bimetallic element in response thereto will move in creeping fashion urging the bridging bar 50 more tightly against the terminals C and D. Since the terminals C and D are flexible, they will yield in that direction of movement of the bridging assembly and the pin 54 on the bridging assembly will engage the arm 56 and disengage its contact from the contact on arm 58 at the preselected overheat temperature limit of, say, 200° F. When these contacts open, the lower element is deenergized. It will usually be desirable with an arrangement of this kind that when an over-heat condition causes the overheat switch to open, the manual resetting of the switch be required to avoid abnormal cycling. This may be readily provided by a spring latch with a notch which engages the leaf 56 when the leaf is moved to an open circuit position.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

Having described my invention, I claim:

1. In combination with an electric water heater of the character having selectively energizable upper and lower heating elements, a control element comprising:

a base adapted to be mounted on said heater;

an insulating terminal block on said base;

a bimetallic element carried by said base, said element
        including a portion movable in one direction in response to a rise in water temperature above a preselected value and in the opposite direction in response to a fall in water temperature below a preselected value;

a contact bridging assembly carried by said movable portion of said bimetallic element, said assembly including contact bridging means and overheat-switch engaging means;

first contact means mounted on said block and connected to said upper heating element;

second contact means mounted on said block and connected to said lower heating element, said second contact means being yieldable in said one direction;

said first and second contact means being disposed on respectively opposite sides of said assembly and in the path of movement of said assembly so that as said assembly moves in said one direction in response to a rising water temperature said assembly bridges said second contact means and breaks from said first contact means; and, a normally closed overheat switch connected to both said upper and lower heating element, said switch being mounted on said block in said path of movement of said assembly and disposed to be operated to an open position by said overheat-switch engaging means upon movement of said assembly, effecting yielding of said second contact means, in said one direction a preselected distance beyond a normal position bridging said second contact in response to a rise in water temperature beyond a selected high temperature limit.

2. Apparatus as specified in claim 1 wherein:

said overheat switch includes a flexible arm extending over said assembly path of movement in said one direction.

3. Apparatus according to claim 1 wherein:

said bimetallic element is of the character operable in snap-acting fashion to positions bridging said first and second contact means, and is operable in modulating fashion to said position opening said overheat switch.

4. A control element for use with an electric water heater of the character having selectively energizable upper and lower heating elements, said control element comprising:

a base including insulating block means thereon;

a first set of switch contacts mounted on said block means and adapted to be connected to said upper element for controlling energization of said upper element;

a second set of switch contacts mounted on said block means and adapted to be connected to said lower element for controlling energization of said lower element, said second set being yieldably mounted and spaced from said first set;

contact bridging means disposed between said first and second sets of contacts and movable in one direction to bridge said second set and break from said first set, and in an opposite direction to bridge said first set and break from said second set, said contact bridging means including overheat-switch engaging means;

temperature responsive means carried by said base and carrying said contact bridging means for moving said contact bridging means in said one direction and said opposite direction in response to increases and decreases, respectively, of temperature sensed by said temperature responsive means;

normally closed overheat switch means mounted on said block means and adapted to be connected to both said upper and lower heating elements and operable to an open position by said overheat-switch engaging means of said bridging means being displaced in said one direction a preselected distance beyond the normal position first effecting bridging of said second set, said displacement being occasioned by a preselected increase in temperature sensed by said temperature responsive means above the temperature of said temperature responsive means first effecting said bridging of said second set.

5. In combination with an electric water heater having a lower heating element and an upper heating element, a temperature control system for controlling the energization of said elements including:

a control element mounted on the upper part of said water heater, said element including, a first set of contacts, a second set of contacts spaced from said first set, said second set being yieldably mounted, a movable bridging assembly disposed between said first and second sets of contacts to effect bridging of either said first set, or alternatively said second set, said bridging assembly including overheat-switch engaging means, means for moving said bridging assembly in one direction and an opposite direction in response to rising and falling water heater temperatures, respectively in the upper part of said heater, a normally closed overheat switch disposed relative to said bridging assembly to be opened by said overheat-switch engaging means, following yielding of said second set of contacts, upon movement of said bridging assembly in said one direction a preselected distance beyond a normal position in which said assembly bridges said second set of contacts, and circuit means connecting said first set of contacts to said upper heating element, said second set of contacts to said lower heating element, and said overheat switch to both said heating elements, whereby an overheat condition in the upper part of said water heater effects opening of said overheat switch to insure deenergization of both said heating elements.

6. In the temperature control system of claim 5:

separate thermostatic switch means responsive to the temperature in the lower part of said water heater in the circuit means connecting said second set of contacts to said lower heating element.

References Cited

UNITED STATES PATENTS

| | | | |
|---|---|---|---|
| 1,819,560 | 8/1931 | Klees | 200 |
| 2,425,030 | 8/1947 | Clark | 200—138 X |
| 2,655,621 | 10/1953 | Lee | 200—138 |
| 2,833,893 | 5/1958 | Weber | 200—138 |

BERNARD A. GILHEANY, *Primary Examiner.*

H. A. LEWITTER, R. COHRS, *Assistant Examiners.*